US008270344B2

(12) United States Patent
Ku et al.

(10) Patent No.: US 8,270,344 B2
(45) Date of Patent: Sep. 18, 2012

(54) SYSTEM FOR COMMUNICATING BETWEEN INTERNET PROTOCOL MULTIMEDIA SUBSYSTEM NETWORKS

(75) Inventors: Bernard Ku, Austin, TX (US); Chaoxin Qiu, Austin, TX (US); Mehrad Yasrebi, Austin, TX (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 1387 days.

(21) Appl. No.: 11/852,896

(22) Filed: Sep. 10, 2007

(65) Prior Publication Data
US 2009/0067409 A1     Mar. 12, 2009

(51) Int. Cl.
*H04W 4/00* (2009.01)
*H04L 12/66* (2006.01)

(52) U.S. Cl. ...... 370/328; 370/356; 370/401; 455/432.1

(58) Field of Classification Search .................. None
See application file for complete search history.

(56) References Cited

U.S. PATENT DOCUMENTS

| | | | |
|---|---|---|---|
| 2003/0128693 A1 | 7/2003 | Segal | |
| 2004/0122934 A1* | 6/2004 | Westman et al. | 709/223 |
| 2004/0174860 A1* | 9/2004 | Van Hammond et al. | 370/352 |
| 2005/0286531 A1* | 12/2005 | Tuohino et al. | 370/395.2 |
| 2007/0130284 A1 | 6/2007 | Stahura | |
| 2008/0019356 A1* | 1/2008 | Marsico | 370/352 |
| 2008/0247384 A1* | 10/2008 | Arauz-Rosado et al. | 370/352 |
| 2008/0274735 A1* | 11/2008 | Choksi et al. | 455/432.2 |
| 2008/0317000 A1* | 12/2008 | Jackson | 370/352 |
| 2009/0093250 A1* | 4/2009 | Jackson et al. | 455/435.1 |

FOREIGN PATENT DOCUMENTS

JP       2002108680       4/2002

OTHER PUBLICATIONS

Qiu et al., "System for Improving Operations in an IMS Network", U.S. Appl. No. 11/733,060 dated Apr. 9, 2007, 22 pages.
Scott Hollenbeck, "E.164 Number Mapping for the Extensible Provisioning Protocol", Standard Tracks, RFC 4114 E.164, Jun. 2005, 17 Pages.

* cited by examiner

*Primary Examiner* — Melanie Jagannathan
(74) *Attorney, Agent, or Firm* — Guntin Meles & Gust, PLC; Pablo Meles

(57) ABSTRACT

A system that incorporates teachings of the present disclosure may include, for example, a Telephone Number Mapping system operating in a first IP Multimedia Subsystem (IMS) communication system having a controller adapted to receive first contact information of a communication device registered through a terminating Serving Call Session Control Function (S-CSCF) operating in a second IMS communication system and second contact information of at least one among an Interrogating CSCF (I-CSCF) of the second IMS communication system and the terminating S-CSCF. Additional embodiments are disclosed.

21 Claims, 4 Drawing Sheets

SYSTEM FOR COMMUNICATING BETWEEN INTERNET PROTOCOL MULTIMEDIA SUBSYSTEM NETWORKS

FIELD OF THE DISCLOSURE

The present disclosure relates generally to communication techniques and more specifically to a system for communicating between Internet Protocol Multimedia Subsystem (IMS) networks.

BACKGROUND

To originate a voice over IP (VoIP) call between a calling device and a called device in an IMS network, an originating Serving Call Session Control Function (S-CSCF) that serves the calling device must generate at least two database queries to connect the call. In a first query, the originating S-CSCF submits an E.164 number of the called device to a tElephone NUmber Mapping (ENUM) system which performs a first database search to identify a SIP URI of the called device. The ENUM provides the SIP URI of the called device to the originating S-CSCF in response to the first query.

In a second query, the originating S-CSCF then submits the received SIP URI to an Interrogating CSCF (I-CSCF) to identify a terminating S-CSCF serving the called device. The I-CSCF forwards the SIP URI to a Home Subscriber Server (HSS) to perform a second database search for the second S-CSCF. The HSS provides to the I-CSCF a SIP URI of the terminating S-CSCF in response to the second query. Upon performing the two database queries, the terminating S-CSCF contacts a corresponding Proxy-CSCF serving the called device to place the call.

The SIP URI of the terminating S-CSCF is recorded in a database of the HSS during registration of an IMS communication device. Registration of IMS devices thus adds to the number of database transactions taking place at the HSS.

Performing multiple database queries and recordings at the HSS during registrations and call originations increases the HSS's workload and thereby introduces cost and potential maintenance issues for a service provider of the IMS network. Similar issues arise when IMS calls are made between IMS networks managed by independent IMS operators.

DETAILED DESCRIPTION

In one embodiment of the present disclosure, a Serving Call Session Control Function (S-CSCF) operating in a first IP Multimedia Subsystem (IMS) communication system can have a controller adapted to receive an assignment to provide communication services to a communication device, supply a first ENUM system of the first IMS communication system with contact information of the communication device and the S-CSCF, and supply a second ENUM system of a second IMS communication system with contact information of the communication device and the S-CSCF, wherein the first and second IMS communication systems are coupled to each other and are independently managed by first and second service providers.

In one embodiment of the present disclosure, a Home Subscriber Server (HSS) operating in a first IMS communication system can have a controller adapted to transmit to an ENUM system operating in a second IMS communication system first contact information of an S-CSCF operating in the first IMS communication system and second contact information of a communication device served by the S-CSCF.

In one embodiment of the present disclosure, an ENUM system operating in a first IMS communication system can have a controller adapted to receive first contact information of a communication device registered through a terminating Serving Call Session Control Function (S-CSCF) operating in a second IMS communication system and second contact information of at least one among an Interrogating CSCF (I-CSCF) of the second IMS communication system and the terminating S-CSCF.

In one embodiment of the present disclosure, an originating communication device can have a controller adapted to supply a first IP Multimedia Subsystem (IMS) network an E.164 number for establishing communications between the originating communication device and a terminating communication device operating in a second IMS network without assistance from an Interrogating Call Session Control Function (I-CSCF) of the first IMS network.

In one embodiment of the present disclosure, a computer-readable storage medium operating in an originating S-CSCF of a first IMS communication system can have computer instructions for querying an ENUM system of the first IMS communication system to provide contact information associated with a terminating communication device operating in a second IMS communication system, and receiving from the ENUM system contact information of the terminating communication device and a terminating S-CSCF assigned to the terminating communication device. The terminating S-CSCF operates in the second IMS communication system, and the first and second IMS communication systems are coupled to each other and are independently managed by first and second service providers.

Figure 1:
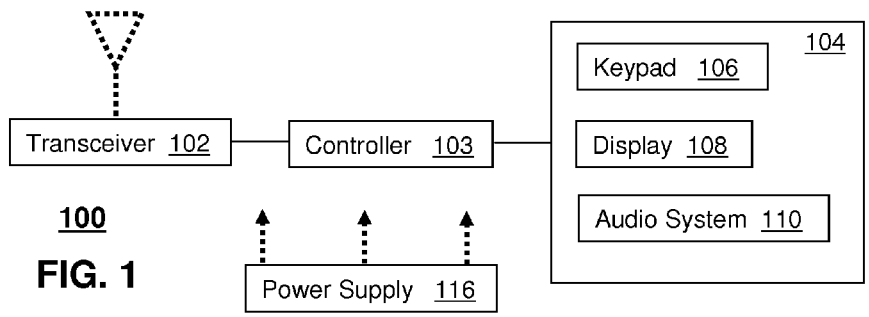
FIG. 1 depicts an exemplary embodiment of an IP Multimedia Subsystem (IMS) communication device (IMS CD)

FIG. 1 depicts an exemplary embodiment of an IMS communication device 100 (e.g. IMS CD). The IMS CD 100 can comprise a wireless or wireline transceiver 102, a user interface (UI) 104, a power supply 116, and a controller 103 for managing operations thereof. The transceiver 102 can utilize common communication technologies to support singly or in combination any number of wireline access technologies such as cable, xDSL, Public Switched Telephone Network (PSTN), and so on.

The transceiver 102 can further support singly or in combination any number of wireless access technologies including without limitation Digital Enhance Cordless Telecommunications (DECT), Bluetooth™, Wireless Fidelity (WiFi), Worldwide Interoperability for Microwave Access (WiMAX), Ultra Wide Band (UWB), software defined radio (SDR), and cellular access technologies such as CDMA-1X, W-CDMA/HSDPA, GSM/GPRS, TDMA/EDGE, and EVDO. SDR can be utilized for accessing public and private communication spectrum with any number of communication protocols that can be dynamically downloaded over-the-air to the IMS CD 100. Next generation wireline and wireless access technologies can also be applied to the present disclosure.

The UI 104 can include a keypad 106 with depressible or touch sensitive keys and a navigation element such as a navigation disk, button, roller ball, or flywheel for manipulating operations of the IMS CD 100. The UI 104 can further include a display 108 such as monochrome or color LCD (Liquid Crystal Display) which can be touch sensitive for manipulating operations of the IMS CD 100 and for conveying images to the end user of said device. The UI 104 can also include an audio system 110 that utilizes common audio technology for conveying and receiving audible signals of the end user.

The power supply 116 can utilize common power management technologies such as replaceable batteries, supply regulation technologies, and charging system technologies for supplying energy to the components of the IMS CD 100 and to facilitate portable applications. Depending on the type of power supply 116 used, the IMS CD 100 can represent a fixed or portable communication device. The controller 103 can utilize computing technologies such as a microprocessor and/or digital signal processor (DSP) with associated storage memory such a Flash, ROM, RAM, SRAM, DRAM or other like technologies for controlling operations of the IMS CD 100.

The IMS CD 100 can represent any number of communication devices including without limitation a laptop computer, a desktop computer, a cell phone, a personal digital assistant, a set-top-box (STB), or a cordless phone, just to name a few. An end user can also utilize more than one type of IMS CD 100 and migrate between IMS CDs when desired. Additionally, each of the IMS CDs 100 can be addressed by one or more communication identifiers for establishing real-time (e.g., voice) and/or non-real time communications (e.g., text or recorded speech).

Figure 2:
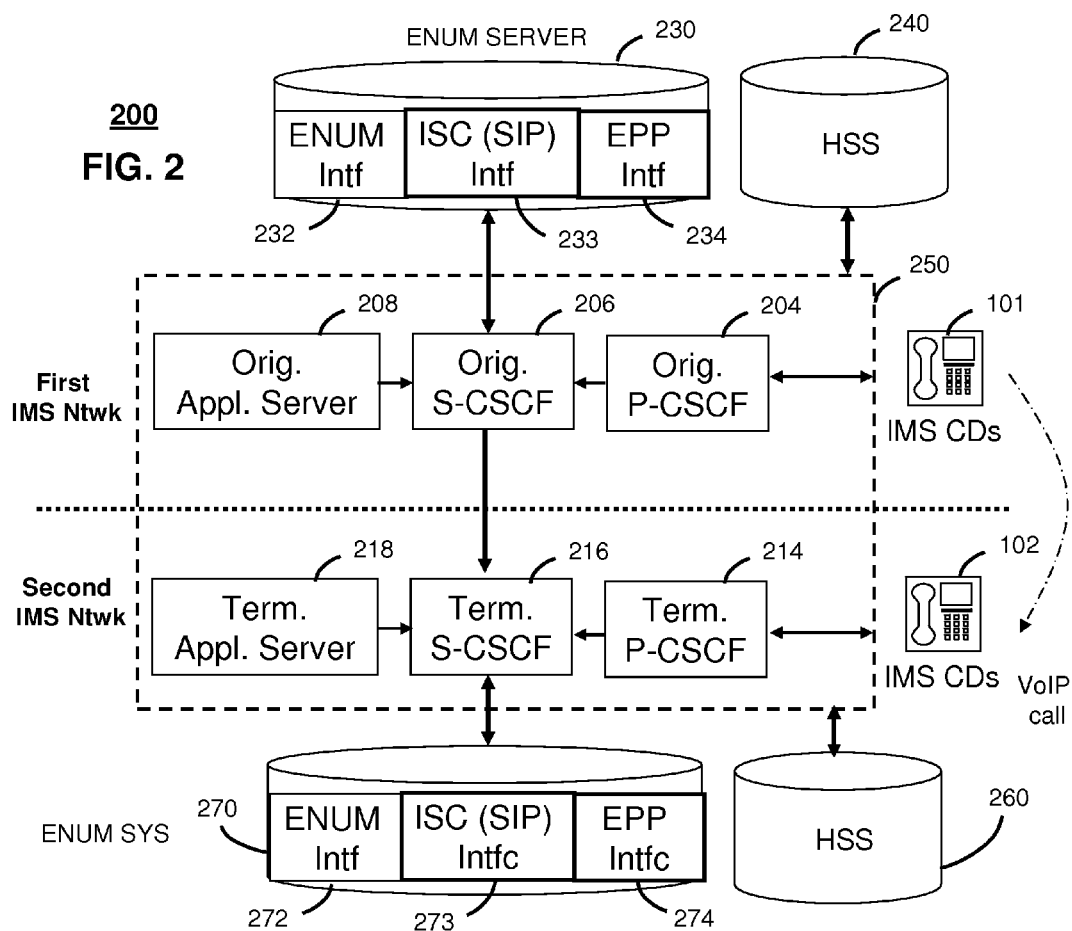
FIG. 2 depicts an exemplary embodiment of inter-carrier IMS networks from which a plurality of IMS CDs operate.

FIG. 2 depicts inter-carrier IP Multimedia Subsystem (IMS) networks 200. Each of the IMS networks 200 can comprise a Home Subscriber Servers (HSS) 240, 260, tElephone NUmber Mapping (ENUM) systems 230, 270, and IMS communication devices (IMS CDs). Each of the IMS networks 200 can support a plurality of IMS CDs denoted by IMS CDs 101 and IMS CDs 102.

For illustration purposes only, one of the IMS networks is presented as an originating IMS network, while the other is presented as a terminating IMS network. This designation is interchangeable. When IMS CDs establish communications within the same IMS network the terms originating and terminating can be applied to the network elements of the same network in describing the call set-up process. FIG. 2 however has been adapted to illustrate a call setup process between IMS networks independently managed by service providers having a peering agreement established between them.

Each IMS network can comprise a number of IMS compliant network elements such as Proxy Call Session Control Functions (P-CSCFs) 204, 214, Serving CSCF (S-CSCFs) 206, 216, and application servers 208, 218. Originating P-CSCF 204 and originating S-CSCF 206 serve IMS CD 101 when a call is originated from IMS CD 101. Terminating P-CSCF 214 and terminating S-CSCF 216 serve IMS CD 102 when a call is terminated at IMS CD 102. As noted earlier, this designation can be interchanged. The application servers 208, 218 can be used to perform originating treatment functions on a calling party number during a communication session. Originating treatment functions can include determining whether the calling party number has international calling services, and/or is requesting special telephony features (e.g., *72 forward calls, *73 cancel call forwarding, *67 for caller ID blocking, and so on).

The ENUM systems 230, 270 comprise a common ENUM interface component 232, 272 for processing ENUM queries from originating S-CSCFs.

The ENUM systems 230, 270 further comprise an ISC (SIP) Interface component 233, 273 that allows said systems to operate as a standard IMS Application Server. The ENUM systems 230, 270 can also include an interface 234, 274 conforming to a modified version of an Extensible Provisioning Protocol (EPP) standard that allows the ENUM systems to receive contact information associated with an IMS CD and its corresponding S-CSCF in conformance with a National Country Code One (CC1) ENUM hierarchy. The modified version of the EPP standard can comply in part with the Internet Engineering Task Force Request for Comments (IETF RFC) 4114.

The illustrations that follow are modified versions of the EPP standard representing "update" and "propagate" EPP commands in abstract pseudo XML code.

Modified EPP "update" command in pseudo XML code:

```
<?xml version="1.0" encoding="UTF-8" standalone="no"?>
<epp xmlns="urn:ietf:params:xml:ns:epp-1.0"
xmlns:xsi="http://www.w3.org/2001/XMLSchema-instance"
xsi:schemaLocation="urn:ietf:params:xml:ns:epp-1.0 epp-1.0.xsd">
    <command>
        <update>
            <UE:update xmlns:UE="urn:ietf:params:xml:ns:UE-1.0"
            xsi:schemaLocation="urn:ietf:params:xml:ns:UE-1.0 UE-
            1.0.xsd">
                <UE:name>sip:+13143901234@cvoip.ims.att.net</UE:
            name>
            </UE:update>
            <SCSCF:update
            xmlns:SCSCF="urn:ietf:params:xml:ns:SCSCF-1.0"
            xsi:schemaLocation="urn:ietf:params:xml:ns:SCFCF-1.0
            SCSCF-1.0.xsd">
                <SCSCF:name>scscf1.cvoip.ims.att.net</SCSCF:name>
            </SCSCF:update>
        </update>
        <clTRID>TRANSACTION_ID</clTRID>
    </command>
</epp>
```

Modified EPP "propagate" command in pseudo XML code;

```
<?xml version="1.0" encoding="UTF-8" standalone="no"?>
<epp xmlns="urn:ietf:params:xml:ns:epp-1.0"
xmlns:xsi="http://www.w3.org/2001/XMLSchema-instance"
xsi:schemaLocation="urn:ietf:params:xml:ns:epp-1.0 epp-1.0.xsd">
    <command>
        <propagate>
            <UE:propagate xmlns:UE="urn:ietf:params:xml:ns:UE-
            1.0" xsi:schemaLocation="urn:ietf:params:xml:ns:UE-1.0 UE-
            1.0.xsd">
                <UE:name>sip:+13143901234@cvoip.ims.att.net</UE:
            name>
            </UE:propagate>
            <SCSCF:propagate
            xmlns:SCSCF="urn:ietf:params:xml:ns:SCSCF-1.0"
            xsi:schemaLocation="urn:ietf:params:xml:ns:SCFCF-1.0
            SCSCF-1.0.xsd">
                <SCSCF:name>scscf1.cvoip.ims.att.net</SCSCF:name>
            </SCSCF:propagate>
        </propagate>
        <clTRID>TRANSACTION_ID</clTRID>
    </command>
</epp>
```

Figure 3:
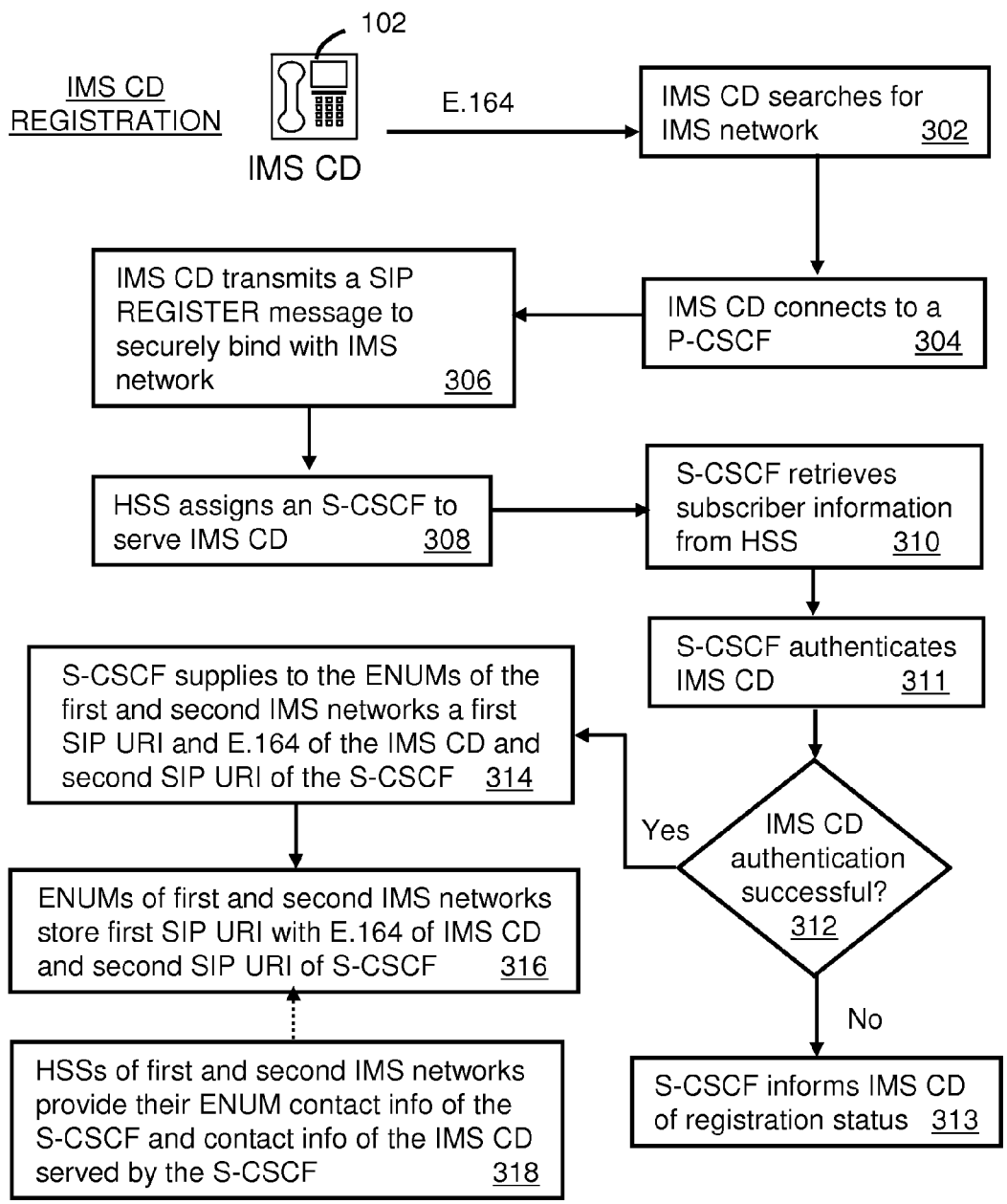
FIGS. 3-4 depict exemplary methods operating in portions of the IMS network.
Figure 4:
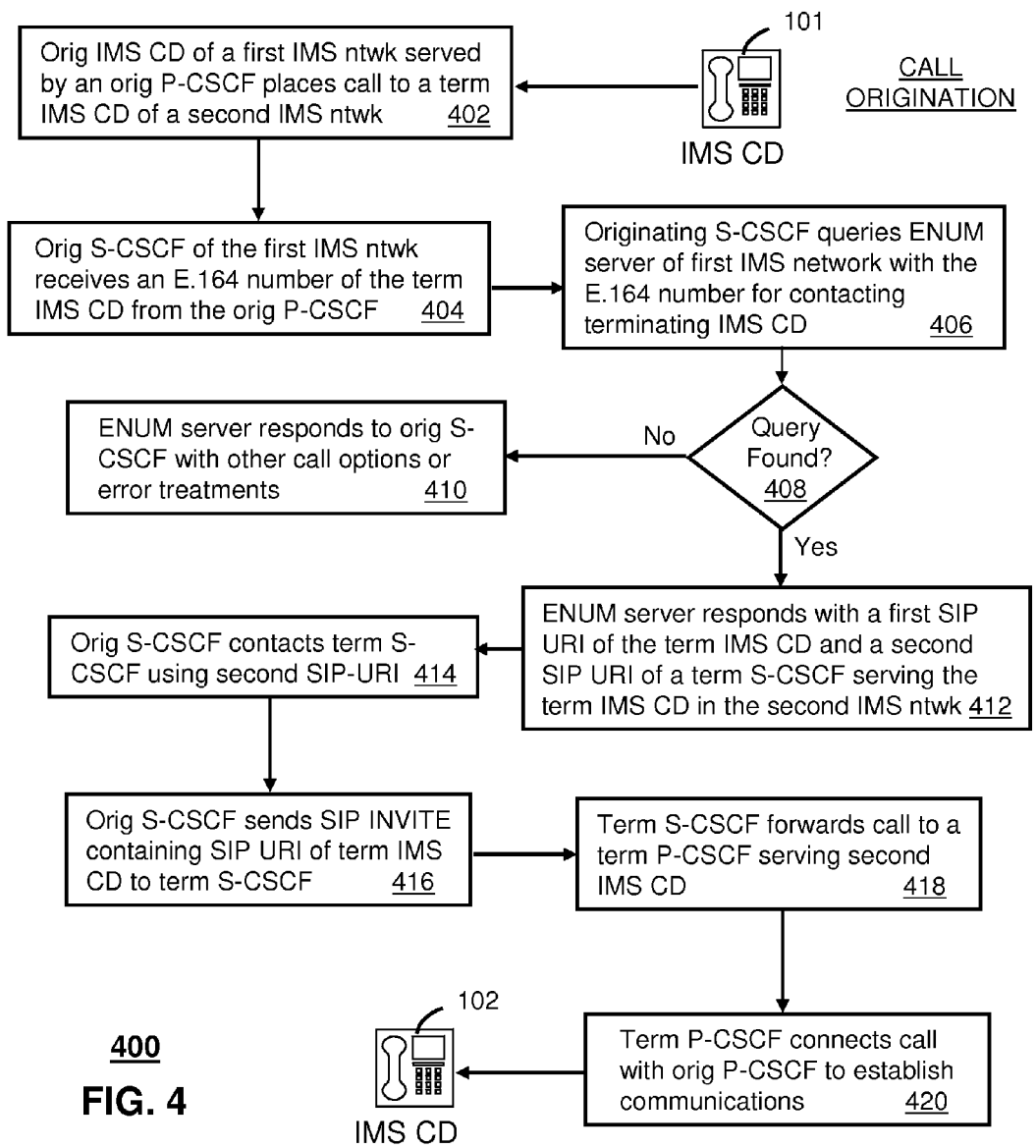

Future derivatives of IETF RFC 4114 can also be applied to the present disclosure when conforming at least in part with methods 300-400 of FIGS. 3-4.

FIG. 3 depicts an exemplary method 300 operating in portions of the IMS network 200. Method 300 illustrates a means for registering IMS CD 102 with the ENUM systems 230, 270 in the inter-operator IMS networks 200. The method 300 can be practiced with more or less steps, and is not limited to the order of steps shown. Reference will be made to FIG. 2 when describing the method 300, although it should be noted that the method 300 can be practiced in other suitable systems.

Method 300 can begin at step 302 in which the IMS CD 102 searches for an IMS network as a result of a power cycle, or a transition between P-CSCFs. The IMS CD 102 looks for a serving IMS network (i.e., the second IMS network in this illustration) and attempts to connect to a P-CSCF of said network in step 304. The second IMS network can include at least one S-CSCF 216 and at least one P-CSCF 214 that provide connectivity services to the IMS CD 102 as shown in FIG. 2. The IMS CD 102 transmits a SIP REGISTER message to build a secure binding with the second IMS network in step 306. The SIP REGISTER message can include an E.164 phone number associated with the IMS CD 102.

During the registration, the HSS 260 of the second IMS network assigns at step 308 S-CSCF 216 to the IMS CD 102. In step 310, the S-CSCF 216 retrieves subscriber information and credentials of the IMS CD 102 from the HSS 260. At step 311, the S-CSCF 216 authenticates IMS CD 102, and at step 312, checks whether the authentication process with the IMS CD 102 is successful. If the authentication fails, the S-CSCF 216 does not register the IMS CD 102 and informs the IMS CD 102 of the registration status at step 313.

If the authentication process is successful, the S-CSCF 216 becomes a "serving" S-CSCF for the IMS CD 102. The binding of the IMS CD 102 and S-CSCF 216 is recorded by the HSS 260 and the P-CSCF 214. The serving S-CSCF 216 at step 314 can then proceed to register the IMS CD 102 with ENUM systems 230, 270. During registration, the S-CSCF 216 performs a "third-party registration" of the IMS CD 102 with the ENUM systems 230, 270 over the ISC interfaces 233, 273 respectively. This can be accomplished by supplying ENUM systems 230, 270 first contact information of the IMS CD 102, and second contact information of the S-CSCF 216 serving the IMS CD 102 over the ISC interfaces 233, 273. The first contact information can represent a SIP URI of the IMS CD 102 with its corresponding E.164 number, while the second contact information can represent a SIP URI of the S-CSCF 216. Alternatively, the first and second contact information can correspond to a fully qualified domain name, or IP address of the IMS CD 102 and a corresponding fully qualified domain name or IP address associated with the S-CSCF 216.

The contact information of the IMS CD 102 and S-CSCF 216 can be supplied by S-CSCF 216 to ENUM systems 270 over its corresponding adapted EPP interface 274. When the registration has been completed with the ENUM system 270, the S-CSCF 216 or ENUM system 270 can perform an inter-carrier registration with ENUM system 230 by supplying the first and second contact information to the adapted EPP interface 234 of ENUM system 230 using an EPP propagation command over a CC1 ENUM hierarchy.

In yet another embodiment, the HSS 260 can be programmed in step 318 to transmit the first and second contact information of the IMS CD 102 and its serving S-CSCF 216 to ENUM system 270 and/or ENUM 230 using a similar method.

Application of any one of these embodiments or other suitable embodiments not described herein results in ENUM systems 230 and 270 recording in step 316 in their respective NAPTR databases a mirror image of the SIP URI and E.164 number of the IMS CD 102 and the SIP URI of the S-CSCF 216 assigned to serve the IMS CD 102.

FIG. 4 depicts an exemplary method 400 operating in portions of the IMS networks 200 that makes use of the registration process of method 300. More specifically, method 400 illustrates a means for using the first and second contact information recorded by ENUM system 230 in a VoIP call based on inter-carrier IMS communications. The method 400 can be practiced with more or less steps shown and is not limited to the order of steps shown. Reference will be made to FIG. 2 when describing method 400, although it should be noted that the method 400 can be practiced in other suitable systems.

The method 400 can begin at step 402 in which the originating IMS CD 101 served by an originating P-CSCF 204 places a VoIP call to the terminating IMS CD 102. In this illustration the IMS CD 101 can represent a VoIP phone placing a call to a second VoIP phone (e.g. IMS CD 102) in an inter-carrier call (e.g. AT&T VoIP phone directs a call to a Sprint VoIP phone). The originating P-CSCF 204 identifies an E.164 phone number of the IMS CD 102 being called, and forwards the E.164 number to the originating S-CSCF 206. At step 404, the originating S-CSCF 206 receives the E.164 number from the originating P-CSCF 204, and at step 406, queries the ENUM system 230 with the E.164 phone number. The originating S-CSCF 206 can also direct the E.164 number to the originating application server 208 to determine if special services are required.

At step 408, the ENUM system 230 can determine whether contact information for the IMS CD 102 is available for the E.164 number. If the terminating IMS CD 102 and corresponding terminating S-CSCF 216 are registered with the ENUM system 230, the SIP URIs for these devices is supplied to the originating S-CSCF 206. If the contact information for said terminating devices is not available, the ENUM system 230 can respond to the originating S-CSCF 206 in step 410 with other call options or common error treatments. Step 410 can arise when the terminating IMS CD 102 is not registered with its IMS network, or when the terminating IMS CD 102 is available on an IMS network which does not perform a similar registration process as disclosed by method 300. In the latter case, the ENUM system 230 can respond with a query response similar to that of a prior art IMS network which supplies a SIP URI of an originating I-CSCF which queries the originating HSS for a SIP URI of the terminating S-CSCF.

If the query at step 408 is successful, the ENUM system 230 responds in step 412 with a SIP URI of the terminating IMS CD 102 and a SIP URI of the terminating S-CSCF 216 serving the IMS CD 102. With the SIP URI of the terminating S-CSCF 216 a query to the HSS 240 is avoided during the call origination process. Upon the originating S-CSCF 206 receiving the SIP URI of the terminating IMS CD 102 and the SIP URI of the terminating S-CSCF 216, the originating S-CSCF 206 can in step 414 transmit to the terminating S-CSCF 216 a SIP INVITE and that contains the SIP URI of the IMS CD 102. The terminating S-CSCF 216 searches for the terminating P-CSCF 214 associated with the SIP URI of IMS CD 102.

Once found, the terminating S-CSCF 216 forwards the call to the terminating P-CSCF 214 which in step 420 establishes communications between the originating and terminating IMS CDs 101, 102 by common means responsive to a subscriber of the terminating IMS CD 102 accepting the call. It should be noted that when the IMS CD 102 is directing a VoIP call to IMS CD 101, the aforementioned steps of method 400 can be applied with the terms "originating" and "terminating" interchanged.

Methods 300-400 collectively remove the need for an intra-IMS network and inter-IMS network HSS query. Removing these HSS queries during a call origination process between IMS networks reduces the workload of the HSSs 240, 270, the latency time for call setup between carriers, and the number of HSS clusters in the IMS networks 200. Consequently, methods 300-400 and their variants can reduce cost and maintenance for HSS systems.

Upon reviewing the embodiments disclosed, it would be evident to an artisan with ordinary skill in the art that said embodiments can be modified, reduced, or enhanced without departing from the scope and spirit of the claims described below. For example, there may be instances in which an IMS operator may not want to provide direct access to a terminating S-CSCF of its network to improve security or for other suitable reasons. Under these circumstances methods 300-400 can be adapted so that the ENUM systems 230, 270 can record a SIP URI of a gateway between inter-operator IMS networks. The gateway can be an Interrogating CSCF (I-CSCF) which is assigned to process VoIP calls between IMS networks.

In this embodiment, an S-CSCF or HSS can provide an ENUM system of another IMS network the SIP URI of its I-CSCF serving as a gateway between the IMS networks. When a call is originated from an IMS CD between IMS networks, the SIP URI of the I-CSCF is supplied by an originating ENUM system to the originating S-CSCF to cross over IMS networks. Although the I-CSCF may make a query to the HSS of its network, the originating S-CSCF does not have to submit a query to the originating HSS, thereby limiting the overall number of HSS queries between the IMS networks. Consequently in this embodiment the workload of the HSSs of both IMS networks experience less queries and the call setup latency is reduced.

These are but a few examples of modifications that can be applied to the present disclosure without departing from the scope of the claims. Accordingly, the reader is directed to the claims section for a fuller understanding of the breadth and scope of the present disclosure.

Figure 5:
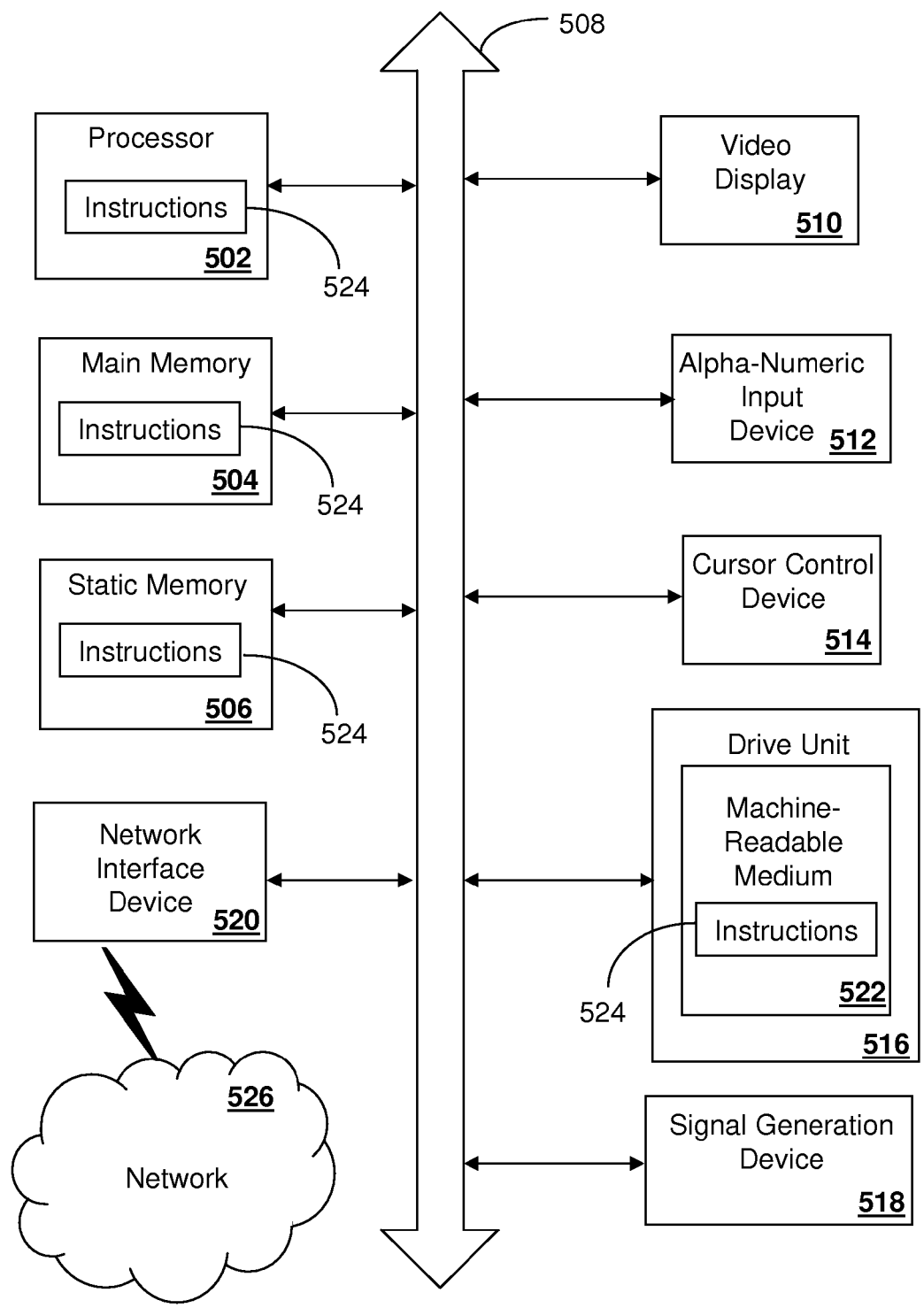
FIG. 5 depicts an exemplary diagrammatic representation of a machine in the form of a computer system within which a set of instructions, when executed, may cause the machine to perform any plurality of the methodologies disclosed herein.

FIG. 5 depicts an exemplary diagrammatic representation of a machine in the form of a computer system 500 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 500 may include a processor 502 (e.g., a central processing unit (CPU), a graphics processing unit (GPU, or both), a main memory 504 and a static memory 506, which communicate with each other via a bus 508. The computer system 500 may further include a video display unit 510 (e.g., a liquid crystal display (LCD), a flat panel, a solid state display, or a cathode ray tube (CRT)). The computer system 500 may include an input device 512 (e.g., a keyboard), a cursor control device 514 (e.g., a mouse), a disk drive unit 516, a signal generation device 518 (e.g., a speaker or remote control) and a network interface device 520.

The disk drive unit 516 may include a machine-readable medium 522 on which is stored one or more sets of instructions (e.g., software 524) embodying any one or more of the methodologies or functions described herein, including those methods illustrated above. The instructions 524 may also reside, completely or at least partially, within the main memory 504, the static memory 506, and/or within the processor 502 during execution thereof by the computer system 500. The main memory 504 and the processor 502 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 524, or that which receives and executes instructions 524 from a propagated signal so that a device connected to a network environment 526 can send or receive voice, video or data, and to communicate over the network 526 using the instructions 524. The instructions 524 may further be transmitted or received over a network 526 via the network interface device 520.

While the machine-readable medium 522 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A serving call session control function operating in a first internet protocol multimedia subsystem communication system; comprising a—memory coupled to a controller, wherein the memory comprises computer instructions which, when executed by the controller, cause the controller to:
   receive an assignment to provide communication services to a communication device wherein the assignment is received from a home subscriber server;
   supply a first telephone number mapping system of the first internet protocol multimedia subsystem communication system with contact information of the communication device and the serving call session control function; and
   supply a second telephone number mapping system of a second internet protocol multimedia subsystem communication system with contact information of the communication device and the serving call session control function, wherein the first and second interne protocol multimedia subsystem communication systems are coupled to each other and are independently managed by first and second service providers.

2. The serving call session control function of claim 1, wherein the first and second telephone number mapping systems have an interface conforming to a modified version of an extensible provisioning protocol standard for receiving the contact information across the first and second interne protocol multimedia subsystem communication systems according to a national country code one telephone number mapping hierarchy.

3. The serving call session control function of claim 2, wherein the modified version of the extensible provisioning protocol standard conforms in part to a standard of the Internet Engineering Task Force.

4. The serving call session control function of claim 1, wherein the memory comprises computer instructions which, when executed, cause the controller to supply the first and second telephone number mapping systems an E.164 number and a first session initiation protocol uniform resource identifier each associated with the communication device and a second session initiation protocol uniform resource identifier associated with the serving call session control function.

5. The serving call session control function of claim 1, wherein the memory comprises computer instructions which, when executed, cause the controller to retrieve authentication information to authenticate the communication device.

6. The serving call session control function of claim 1, wherein the memory comprises computer instructions which, when executed, cause the controller to receive a session initiation protocol INVITE from an originating serving call session control function of the second interne protocol multimedia subsystem communication system for establishing communications with the communication device.

7. The serving call session control function of claim 6, wherein the session initiation protocol INVITE comprises a session initiation protocol uniform resource identifier identifying the communication device, and wherein the memory comprises computer instructions which, when executed, cause the controller to:
   identify from the session initiation protocol uniform resource identifier of the communication device a corresponding proxy call session control function of the first interne protocol multimedia subsystem communication system associated with the communication device; and
   transmit the session initiation protocol INVITE to the proxy call session control function to establish communications with the communication device.

8. A system, comprising a memory coupled to a controller, wherein the memory comprises computer instructions which, when executed, cause the controller to:
- receive an assignment to provide communication services to a communication device;
- supply a first telephone number mapping system of a first internet protocol multimedia subsystem communication system with contact information of the communication device and a serving call session control function operating in the first internet protocol multimedia subsystem communication system;
- supply a second telephone number mapping system of a second internet protocol multimedia subsystem communication system with contact information of the communication device and the serving call session control function, wherein the first and second internet protocol multimedia subsystem communication systems are coupled to each other and are independently managed by first and second service providers; and
- retrieve authentication information to authenticate the communication device.

9. The serving call session control function of claim 8, wherein the first and second telephone number mapping systems have an interface conforming to a modified version of an extensible provisioning protocol standard for receiving the contact information across the first and second internet protocol multimedia subsystem communication systems according to a national country code one telephone number mapping hierarchy.

10. The serving call session control function of claim 9, wherein the modified version of the extensible provisioning protocol standard conforms at least in part to a standard of the Internet Engineering Task Force.

11. The serving call session control function of claim 8, wherein the controller is adapted to supply the first and second telephone number mapping systems an E.164 number and a first session initiation protocol uniform resource identifier each associated with the communication device and a second session initiation protocol uniform resource identifier associated with the serving call session control function.

12. The serving call session control function of claim 8, wherein the serving call session control function receives its assignment from a home subscriber server.

13. The serving call session control function of claim 8, wherein the controller is adapted to receive a session initiation protocol INVITE from an originating serving call session control function of the second internet protocol multimedia subsystem communication system for establishing communications with the communication device.

14. The serving call session control function of claim 13, wherein the session initiation protocol INVITE comprises a session initiation protocol uniform resource identifier identifying the communication device, and wherein the controller is adapted to:
- identify from the session initiation protocol uniform resource identifier of the communication device a corresponding proxy call session control function of the first internet protocol multimedia subsystem communication system associated with the communication device; and
- transmit the session initiation protocol INVITE to the proxy call session control function to establish communications with the communication device.

15. A system, comprising a memory coupled to a controller, wherein the memory comprises computer instructions which, when executed, cause the controller to:
- receive an assignment to provide communication services to a communication device;
- supply a first telephone number mapping system of a first internet protocol multimedia subsystem communication system with contact information of the communication device and a serving call session control function operating in the first internet protocol multimedia subsystem communication system;
- supply a second telephone number mapping system of a second internet protocol multimedia subsystem communication system with contact information of the communication device and the serving call session control function, wherein the first and second internet protocol multimedia subsystem communication systems are coupled to each other and are independently managed by first and second service providers; and
- receive a session initiation protocol INVITE from an originating serving call session control function of the second internet protocol multimedia subsystem communication system for establishing communications with the communication device.

16. The serving call session control function of claim 15, wherein the first and second telephone number mapping systems have an interface conforming to a modified version of an extensible provisioning protocol standard for receiving the contact information across the first and second internet protocol multimedia subsystem communication systems according to a national country code one telephone number mapping hierarchy.

17. The serving call session control function of claim 16, wherein the modified version of the extensible provisioning protocol standard conforms in part to a standard dictated by the Internet Engineering Task Force.

18. The serving call session control function of claim 15, wherein the controller is adapted to retrieve authentication information to authenticate the communication device.

19. The serving call session control function of claim 15, wherein the controller is adapted to receive a session initiation protocol INVITE from an originating serving call session control function of the second internet protocol multimedia subsystem communication system for establishing communications with the communication device.

20. The serving call session control function of claim 19, wherein the session initiation protocol INVITE comprises a session initiation protocol uniform resource identifier identifying the communication device, and wherein the controller is adapted to:
- identify from session initiation protocol uniform resource identifier of the communication device a corresponding proxy call session control function of the first internet protocol multimedia subsystem communication system associated with the communication device; and
- transmit the session initiation protocol INVITE to the proxy call session control function to establish communications with the communication device.

21. The serving call session control function of claim 15, wherein the controller is adapted to supply the first and second telephone number mapping systems an E. 164 number and a
- a first session initiation protocol uniform resource identifier each associated with the communication device and a second session initiation protocol uniform resource identifier associated with the serving call session control function.

* * * * *